United States Patent Office 3,235,512
Patented Feb. 15, 1966

3,235,512
HIGH TEMPERATURE-RESISTANT CATALYST CARRIER AND METHOD OF PREPARATION THEREOF
Karl H. Koepernik, Hannover, Germany, assignor to Kali-Chemie Aktiengesellschaft, Hannover, Germany, a corporation of Germany
No Drawing. Filed Feb. 27, 1962, Ser. No. 176,127
Claims priority, application Germany, Oct. 15, 1960, K 41,894; Mar. 2, 1961, K 43,062; Nov. 3, 1961, K 45,116
20 Claims. (Cl. 252—455)

This application is a continuation-in-part of copending application Serial No. 144,044, filed October 10, 1961, and entitled "Oxidation Catalyst and Process of Making and Using Same," now abandoned.

The present invention relates to a process of producing improved catalysts and catalyst carriers, and to such new and improved catalysts and catalyst carriers composed of clay and aluminum oxide.

The use of metals of the platinum group deposited on a support as catalysts for oxidation reactions is known. However, the known catalysts of this type have the disadvantage that their mechanical strength properties and their stability and resistance to high temperatures are unsatisfactory. These properties are of particular importance when employing such catalysts in the combustion and purification of waste gases as they are obtained in many industrial processes, and especially in the conversion of exhaust gases into harmless oxidation products.

It is also known to use platinum catalysts in which the platinum metal is deposited on carriers composed of silica and aluminum oxide, for reforming gasolines and naphtha fractions. Such catalysts, however, also lack the required mechanical strength properties and their oxidative activity is insufficient for the combustion of waste and exhaust gases.

It is one object of the present invention to provide a new and simple process of producing high temperature resistant, shaped platinum or, respectively, palladium catalysts of excellent mechanical strength properties which are substantially free of the disadvantages of known catalysts of this type.

Another object of the present invention is to provide new, high temperature resistant, supported platinum, or, respectively, palladium catalysts of high mechanical strength properties as they may be employed in the combustion and purification of waste and exhaust gases.

A further object of the present invention is to provide a new process of complete oxidative combustion of waste gases obtained in industrial processes and of the exhaust gases of internal-combustion engines and the like.

Still another object of the present invention is to provide suitable and highly effective carriers for such and other catalysts which carriers are at least as effective as carriers based on γ-alumina but which, in contrast to γ-alumina, yield molded carrier bodies of excellent hardness, resistance to crushing, impact, and abrasion, and thermal stability.

Another object of the present invention is to provide a simple process of producing such catalyst carriers.

Other objects of the present invention and advantageous features thereof will become apparent as the description proceeds.

In principle the present invention consists in providing a specific catalyst carrier composed of clay and aluminum oxide. Such a carrier according to the present invention combines the advantageous adsorptive and the catalytic activity-increasing properties of active aluminum oxide with the mechanical strength properties of baked ceramic materials. Carriers of high porosity can be prepared in this manner. Such carriers are as effective in their catalytic activity as γ-aluminum oxide but do not have the known disadvantage of said γ-aluminum oxide to yield, on molding, molded bodies of only low mechanical strength. On the contrary, the new carriers according to the present invention are distinguished from such known γ-aluminum oxide carriers by their remarkable hardness, resistance to crushing, impact, and abrasion. It is possible to vary the properties of the carrier by varying the proportion of clay and aluminum oxide in the carrier and thus to produce optimum catalytic activity and physical properties.

A noteworthy advantage of the new carrier is that the clay-containing mixtures can readily be molded to any desired shape, for instance, spheres, pellets, rings, extruded cylinders, or other shaped articles. When using aluminum oxide alone or aluminum oxide mixed with other compounds, molding is often difficult due to the low compressibility or plasticity of aluminum oxide or combinations thereof with other materials.

Clays which are preferably used for the purpose of the present invention are clays of the kaolinite type as well as clays which essentially contain fire clay mineral, halloysite, montmorillonite, sepiolite, attapulgite, and the like. It is, of course, understood that not all such types of clay are of like usefulness in the preparation of the carrier bodies according to the present invention. The specific properties of each type of clay, its grain size distribution, its contents of accompanying minerals such as quartz, feldspar, and others represent variables which affect the mechanical properties of the carrier and its improving effect upon the activity of the catalyst. The amounts of iron oxide or of alkali metal compounds in the clay may also influence the catalytic activity of the carrier. By selecting the proper type of clay, it is possible to produce carrier bodies of a widely varying range of catalytic and mechanical properties of the final catalyst and to adapt the same to any desired purpose.

The other component of the carrier according to the present invention is aluminum hydroxide. Best results are achieved with aluminum hydroxide produced according to the Bayer process, i.e., by decomposing bauxite at elevated temperature with sodium hydroxide solution and cooling the resulting sodium aluminate solution to precipitate the aluminum hydroxide in the form of hydrargillite. Of course, aluminum hydroxide made by other methods may also be used.

An especially advantageous feature of the process of producing the carrier according to the present invention is the use of only two components, namely of aluminum hydroxide and clay, which components do not require any specific preliminary treatment. The natural clay is simply freed of coarse foreign matter particles, foreign minerals, coarse sand, and the like according to conventional methods of the ceramic art. The clay is then dried and ground so that it is outwardly dry and free-flowing.

The clay does not require thermal or chemical processing or pretreatment as necessary, for instance, when producing cracking catalysts from bentonite or kaolin clays. Such clays are, for instance, first treated and aged with acids in order to at least partly remove alkali metal compounds, iron oxide, aluminum oxide, and the like. On the contrary, when subjecting the clay to an acid treatment, it has been found that it attains an acidic character due to the presence of residual acidic groups such as sulfate, halogenide, etc.

To produce the catalyst carrier according to the present invention, the dried and ground clay is intimately mixed with commercial pure aluminum hydroxide. If desired, agents causing porosity of the resulting carrier, such as wood flour, starch, carbon, or the like, and plasticizing agents and lubricants, such as stearic acid, polyvinyl alcohol, or synthetic wax emulsions may be added to said mixture. The resulting mixture is then converted into a plastic mass by admixing sufficient amounts of water thereto. The plastic mixture is molded according to known processes into pellets, spheres, extruded cylinders, rings, or other shaped particles. The resulting formed carriers are dried at a temperature of about 100° C. and are then calcined by slowly and gradually increasing the temperature to a temperature ranging between 900° C. and 1400° C., preferably to a temperature between 1000° C. and 1200° C. depending upon the type of clay used and the purpose for which the catalysts are to be employed. Thereby, the clay and the aluminum hydroxide are dehydrated and the porosity producing agents and lubricants are burned off.

In place of the above described wet forming process, the carrier may also be formed in the dry state. For this purpose the components, i.e., clay, aluminum hydroxide, and, if desired, porosity producing agents and the like are mixed without the addition of water in the dry state and a lubricant, preferably stearic acid or polyvinyl alcohol is added thereto. The resulting dry mixture is then compressed in a tabletting or pellet forming press. Thereafter, the formed carrier is calcined as described hereinabove, preferably at a temperature between 1000° C. and 1100° C.

Sintering of the clay during calcination results in such a solidification and hardening of the formed carriers that excellent burst pressure strength and resistance to abrasion are achieved. Extruded cylinders of 4 mm. diameter and between 8 mm. and 12 mm. length are, for instance, tested for their burst pressure strength and resistance to abrasion in the following manner:

100 g. of the extruded cylinders are placed into a porcelain ball mill (inner dimensions: 16 cm. x 16 cm.) with 4 steel balls of 15 mm. diameter. The ball mill is rotated around its transverse horizontal axis with 60 r.p.m. Such a rotation around its transverse axis increases the impact effect of the balls. After milling for about one hour, the extruded cylinders are sieved through a sieve of 2 mm. mesh width. The carriers prepared according to Example 1 as given hereinafter, showed a loss of 3.2% due to impact and abrasion when calcined at 1350° C., a loss of 9.8% when calcined at 1100° C., and a loss of 30.8% when calcined at 950° C. When subjecting compressed tablets composed of pure active alumina and having a diameter of 4.5 mm. each, to the same milling test, the tablets were completely crushed and the sieving loss was 100%.

The burst pressure strength was measured on a crushing strength-testing machine. Extruded cylinders of a length of 6 mm. and a diameter of 4 mm. were tested. The mean value of 20 tests was calculated. The extruded cylinders were subjected to a load in the crushing strength-testing machine between two steel plates and that load was determined which caused bursting or crushing of the cylinders. Extruded cylinder calcined at 1100° C., for instance, had a burst pressure strength of about 20 kg. while the above mentioned compressed alumina tablets had a burst pressure strength of only 8 kg.

The calcination temperature affects not only these strength properties but also the specific surface area of the carrier bodies. The specific surface area of the carrier becomes smaller with increasing calcination temperature. The specific surface area in turn is related to the activity, whereby, however, the activity is not necessarily proportional to an increase in the surface area but in general increases considerably less than the surface area. Higher calcination temperatures result in better strength properties. On the other hand, the surface area of the catalyst is reduced with increasing temperature. The specific surface area of carriers obtained according to the present invention are between about 1 sq. m./g. and about 100 sq. m./g. depending upon calcination temperature and composition. The pore volume of such carriers is of the magnitude of 50% by volume while the pore diameter, in general, is between about 300 angstroms and about 3000 angstroms. A calcination temperature between about 1000° C. and about 1100° C. is preferred because at such temperatures, catalyst carriers of excellent strength properties which are fully satisfactory for most requirements are obtained. The surface area of catalyst carriers calcined at such a temperature and their pore diameters are also highly favorable. In contrast thereto, the active alumina carriers produced according to known processes possess only insufficient strength properties.

The proportions of clay to aluminum hydroxide are preferably chosen in such a manner that optimum activity and firmness of the resulting carrier are achieved. Ten parts by weight to 90 parts by weight of clay may be used for about 90 parts by weight to 10 parts by weight of aluminum hydroxide. Preferred amounts are 20 parts by weight to 40 parts by weight of clay and 80 parts by weight to 60 parts by weight of aluminum hydroxide. If the clay content is too low, the firmness and mechanical strength properties of the carrier decrease. If the clay content is too high, the catalyst activity is reduced due to the greater density of the calcined carrier.

According to a preferred embodiment of the present invention, the porosity of the carrier according to the present invention is improved by first expelling the chemically bound water of the aluminum hydroxide and, for instance, of the kaolinite-type clay by heating to a temperature between about 300° C. and about 650° C. At said temperature, aluminum hydroxide is converted by dehydration into γ-aluminum oxide and kaolinite into meta-kaolin, i.e., the dehydrated form of kaolinite. At the temperature range between about 900° C. and about 1050° C. the meta-kaolin decomposes into its components γ-aluminum oxide of silicon dioxide which, on further calcination, are partly combined to mullite. When proceeding in such a two-step process, namely by first dehydrating the components at 300–650° C. and then calcining the dehydrated components at 900–1400° C., a porous carrier with a high specific surface area is produced. Such a carrier possesses the essential catalytic and adsorptive properties of γ-aluminum oxide and at the same time a high mechanical strength.

The term "γ-aluminum oxide" as used herein and in the claims annexed hereto, comprises all those transition stages as they are obtained on dehydrating and calcining hydrargillite at various temperatures, before said hydrargillite is converted into stable α-aluminum oxide.

The clay-aluminum oxide carrier according to the present invention is especially suitable for the preparation of catalysts which heretofore used active alumina as carrier, for instance, for the preparation of catalysts useful for oxidation and dehydrogenation, for hydrogenation and desulfurization, for reforming, isomerizing and cyclizing reactions.

Catalytically active metals or, respectively, metal oxides which can be deposited on carriers according to the present invention are, for instance, platinum and the metals of the platinum group such as ruthenium, rhodium, and palladium. Nickel, copper, and silver catalysts may also be prepared. Furthermore, the oxides of base metals such as iron, cobalt, manganese, chromium, molybdenum, and tungsten, vanadium, titanium, thorium, cerium, and others may also be deposited thereon. It is furthermore possible to prepare combinations of the above mentioned catalysts such as copper oxide-chromium oxide catalysts. Additions of alkali metal compounds, alkaline earth metal compounds which serve as stabilizers, and others may also be made.

These carrier catalysts according to the present invention are prepared by impregnating the carrier, preferably calcined at 1000–1100° C., with the respective metal salt solutions or by spraying the same thereon. The metals

EXAMPLE 5

41 kg. of dried and ground kaolinite clay of a water content of about 10% are mixed with 96 kg. of aluminum hydroxide containing about 64% of aluminum oxide and with 2.74 kg. of "Mulrex" as plasticizing agent. "Mulrex" is an emulsion of synthetic waxes of a water content of about 50% which is supplied by the firm Mobil Oil, Hamburg, Germany. About 10% of water calculated for the total amount of clay, aluminum hydroxide, and wax emulsion are added to said solution in order to convert the mixture to a plastic consistency which can be extruded by an extruder. After extrusion and cutting, the resulting cylindrical bodies are dried at 120° C. for 3 hours and are then calcined, after increasing the temperature to 1100° C. within several hours, in a chamber oven at 1100° C. for one hour with admission of air. After cooling, the resulting carrier bodies are impregnated with an aqueous 0.08% platinum (II) tetrammine hydroxide solution using one liter of solution for each liter of carrier. The carrier is kept in said impregnating solution at 90° C. for about 3 hours. The carrier absorbs the platinum compound with the exception of a small residue of about 1% of the total amount of platinum compound present in the solution. The resulting catalyst is removed from the solution, dried at 120° C. for 2 hours and subsequently at 250° C. for one hour and is then activated in a calcining oven or a rotary kiln by slowly heating to 800° C. with the admission of air.

Example 6

The carrier bodies obtained according to Example 2 are impregnated with an aqueous solution containing 0.08% platinum (II) tetrammine chloride whereby one liter of said solution is used for each liter of carrier. The mixture is kept at 90° C. for about 3 hours. The catalyst is removed from the solution, dried at 120° C. for 2 hours and subsequently at 250° C. for one hour. Activation of the catalyst is effected by heating the dried catalyst at 800° C. with the admission of air.

In order to test the activity of catalysts according to the present invention, the following experiment was carried out, whereby the completeness of the combustion of n-hexane was determined.

The catalyst prepared according to the Example 5 was used. It consisted of extruded cylinders of 4 mm. diameter varying in length from 5 mm. to 15 mm. Its platinum content was about 0.08%. The test conditions were as follows:

The gas mixture entering the catalyst chamber was composed of 94.43%, by volume, of nitrogen,
5.25%, by volume, of oxygen, and
0.32%, by volume, of n-hexane corresponding to 3,200 parts per million.

The temperature of the gas mixture entering the catalyst chamber was 350° C.

Its space velocity was 30,000 hr.$^{-1}$.

Results (a) When operating under the above indicated test conditions, combustion of the n-hexane took place to about 95% on a freshly prepared catalyst.

(b) 100 cc. of the catalyst were subjected to a vibrating treatment in a 1 l. vibrating mill with a hard porcelain receptacle, vibrating at about 1000 vibrations per minute and a vibrational amplitude of 1 cm., for 24 hours. The abrasion loss of the thus treated catalyst extrusion cylinders was 7.6%. The abraded dust was removed by sieving.

After such a vibrating treatment combustion of the n-hexane took place to about 98% under the test conditions mentioned above.

(c) The catalyst was subjected to an aging treatment by heating to 900° C. for 24 hours. After such a heat treatment, combustion of about 89% of the n-hexane took place under the above described test conditions.

The activity of such catalysts was also tested by determining the completeness of combustion of carbon monoxide in a mixture of nitrogen and oxygen under the following conditions:

The catalyst consisted of extruded cylinders of 4 mm. diameter and varying length between 4 mm. and 8 mm. Its platinum content was about 0.1%.

The composition of the gas mixture entering the catalyst was as follows:

91.96%, by volume, of nitrogen,
5.24%, by volume, of oxygen,
2.80%, by volume, of carbon monoxide.

The temperature of the gas mixture entering the catalyst chamber was 350° C.

Its space velocity was 28,600 hr.$^{-1}$.

Results (a) On operating under the above indicated test conditions, combustion of carbon monoxide took place to about 95% on a freshly prepared catalyst.

(b) 100 cc. of the catalyst were subjected to a vibrating treatment in a one liter vibrating mill with a hard porcelain receptacle, vibrating at about 1450 vibrations per minute and a vibrational amplitude of 4 mm. for 15 hours. The abrasion loss of the thus treated catalyst extrusion cylinders was 4.7%. The abraded dust was removed by sieving.

After such a vibrating treatment, combustion of carbon monoxide took place to about 99% under the above mentioned test conditions.

(c) The catalyst was subjected to an aging treatment by heating to 900° C. for 15 hours. After such a heat treatment, combustion of about 95% of the carbon monoxide took place under the above described test conditions.

The catalysts according to the present invention have proved of special value in the catalytic combustion and purification of waste gases in the presence of air or, respectively, oxygen. Such waste gases are obtained, for instance, in the manufacture of phthalic acid anhydride, in the lacquered wire industry, in the manufacture of plastics reenforced by glass fibers, in the production of gas black, in the manufacture of fish meal, in the operation of combustion engines such as Otto carburetor engines, i.e., internal reciprocating combustion engines, or diesel engines, and the like. The waste gases contain, for instance, saturated and unsaturated hydrocarbons, oxygen-containing hydrocarbons, carbon monoxide, hydrogen, hydrogen sulfide, organic sulfur compounds, ammonia, amines, and other obnoxious compounds, complete combustion of which to combustion products, which are not detrimental to the health, is desired.

As stated above, relatively small platinum or, respectively, palladium contents between about 0.01% and about 0.20% are, in general, sufficient to cause complete catalytic combustion of such waste and exhaust gases. In general, a higher platinum metal content does not result in a further improvement of complete catalytic oxidation of such waste gases, even if difficultly ignitable hydrocarbons as methane, ethane, and propane are present therein.

An increase in the platinum metal content might be of advantage only when the waste gases contain such hydrocarbons in higher concentrations exceeding about 1%, by volume.

Combustion of waste or exhaust gases by means of the catalyst according to the present invention is effected by passing a stream of said gases and of an oxygen-containing gas, such as air, at an initial temperature between about 250° C. and about 850° C. into contact with a catalyst according to the present invention as described hereinabove.

As stated hereinabove, the catalyst carriers according to the present invention cannot only be used for preparor metal oxides can be precipitated from their salts according to known methods, for instance, by heat decomposition, precipitation, reduction, and the like. Sometimes, it may be of advantage to impregnate the carrier before its calcination.

The following examples serve to illustrated the process of making the new carrier according to the present invention without, however, being limited thereto.

EXAMPLE 1

35 kg. of a kaolinite-type clay containing adsorptively and structurally bound water in an amount of about 10% are freed of coarse foreign matter and are ground. The ground kaoline clay is then mixed with 65 kg. of aluminum hydroxide containing 65% of aluminum oxide and with 2 kg. of an emulsion of a synthetic wax of a water content of about 50% as it is sold under the trademark "Mulrex" by Mobil Oil of Hamburg, Germany. A total of about 10% of water calculated for the total amount of clay, aluminum hydroxide, and wax emulsion are added to said mixture in order to convert the same to plastic consistency so that it can be extruded by an extruder. After extrusion and cutting, the resulting cylindrical bodies are dried at 80° C. for 15 hours. After increasing the temperature to 1100° C. within 2–5 hours, the extruded cylinders are placed into a chamotte crucible and are calcined at 1100° C. for two hours. The burst pressure strength of the extruded cylinders of a diameter of 4 mm. is, as an average, 20 kg.

EXAMPLE 2

20 kg. of dried and ground bentonite and 80 kg. of aluminum hydroxide with 65% of aluminum oxide are intimately mixed with 40 kg. of an aqueous 25% dextrin solution in a pug mill to convert the mixture into a consistency which permits extrusion. After extrusion and cutting, the resulting cylindrical bodies are dried at 80° C. for 15 hours, are slowly heated to 1100° C., and are calcined in chamotte crucibles at 1100° C. for two hours. The burst pressure strength of the extruded cylinders of 4 mm. diameter is, as an average, 19 kg.

EXAMPLE 3

80 kg. of dried and ground attapulgite clay and 20 kg. of aluminum hydroxide containing 65% of aluminum oxide are intimately mixed with 90 kg. of an aqueous 25% dextrin solution in a pug mill in order to convert the mixture to a plastic consistency which can be extruded by an extruder. After extrusion and cutting, the extruded bodies are dried at 80° C. for 15 hours, slowly heated to 1000° C., and calcined at 1000° C. in chamotte crucibles for 3 hours. The burst pressure strength of the extruded cylinders of 4 mm. diameter is, as an average, 18 kg.

Example 4

86.5 kg. of dried and ground kaolinite clay are intimately mixed with 37 kg. of aluminum hydroxide containing about 65% of aluminum oxide and 6.2 kg. of activated charcoal of a grain size between 0.2 mm. and 0.75 mm. 23.4 kg. of water are admixed in order to convert the mixture to a plastic consistency so that it can be extruded by an extruder. The mixture is then extruded to extrusions of 4 mm. diameter and is cut to cylinders of a length between 5 mm. and 10 mm. The extruded cylinders are dried at 100° C., are first dehydrated at 550° C. in a rotating cylindrical kiln, and are then calcined at 1000° C. in the same kiln. In this case the drying, dehydration, and calcination period is shorter than in the other examples due to greater efficacy of the rotating kiln.

It may be pointed out that the shaped catalyst carrier, after calcination and evaporation of its water content, is composed of about 14 parts, by weight, to about 93 parts, by weight, of chemically untreated clay and of about 86 parts, by weight, to about 7 parts, by weight, of aluminum oxide.

As stated hereinabove, carriers prepared according to the present invention as described hereinabove are especially suitable for the preparation of oxidation catalysts as they may be employed, for instance, in the combustion and purification of waste and exhaust gases. For this purpose, the carrier obtained according to the preceding examples is impregnated with a solution of a platinum or, respectively, palladium compound, for instance, with hexachloro platinic acid, tetrachloro platinous acid, the ammonium salt of hexachloro platinic acid, platinum (IV) hexammine chloride, platinum (II) tetrammine chloride, and others, and preferably with platinum (II) tetrammine hydroxide or, respectively, with the corresponding palladium compounds or palladium (II) chloride, dried, and activated by calcination at a temperature of at least 800° C. with the admission of air or oxygen.

Catalysts obtained according to the present invention have a very high oxidative activity so that they can readily be used as catalysts in the complete combustion of saturated and unsaturated hydrocarbons, carbon monoxide, and other waste and exhaust gases. They are superior to known catalysts of this type by their high mechanical strength and their remarkable resistance to high temperatures. These advantageous properties are achieved by the very specific combination of chemically untreated clay, alumina, and platinum or, respectively, palladium.

Catalysts according to the present invention have the further advantage that their platinum metal content is rather low and is preferably between about 0.05% and about 0.1% and that its carrier can be prepared in a relatively simple and economical manner.

Use of a solution of platinum (II) tetrammine hydroxide or of platinum (II) tetrammine chloride for impregnating the clay-aluminum oxide carrier results in an especially thorough penetration of said carrier and yields catalysts of excellent activity even when they are subjected to abrasion with a loss of material of 10% to 20%. This high activity even after prolonged rough service conditions can be explained by the fact that the surface of the catalyst is continually renewed and thus purified due to continuous slight abrasion taking place, for instance, when used in motor vehicles to catalytically effect total combustion of the motor exhaust gases. Thereby continual renewal of the catalyst surface is of special importance because inactivation of the catalyst by poisonous lead compounds and the like is prevented.

Preferably like volumes of impregnating solution and carrier are used for impregnation, i.e., about 1 l. of the solution of the platinum metal compound is used for each liter of carrier. With such proportions practically the entire platinum metal present in the solution is absorbed by the carrier. Therefore, the concentration of the platinum metal solution is chosen in such a manner that it is about equal to the desired platinum metal content of the catalyst. Thus, to produce catalyst containing about 0.05% of platinum metal, an 0.05% platinum metal solution is used for impregnation. In general, impregnation is effected by adding the calcined carrier to the cold or hot impregnating solution. The resulting mixture is preferably heated to about 90° C. and is kept at said temperature for about 3 hours. The platinum metal is almost completely absorbed by the carrier from the solution by selective adsorption. The impregnated catalyst carrier is separated from the solution, dried, and calcined at 800–900° C. with the admission of air in order to effect activation.

The following examples serve to illustrate the preparation of suitable oxydation and the like catalysts containing platinum metals as catalytic metal. The invention, however, is not limited to said examples.

ing platinum and the like catalysts. They are also useful in producing highly active, temperature resistant cracking, reforming, or decomposing catalysts with nickel as catalytically effective metal.

The nickel catalysts according to the present invention can be prepared in a simple manner by impregnating carriers which have been prepared as described hereinabove, with a solution of a nickel salt. If desired, known promoters or activators such as copper, iron, and other compounds are added to such nickel salt solutions. The impregnated catalyst bodies are dried at about 100° C. and are then calcined at about 500–600° C.

The following example serves to illustrate the preparation of such valuable nickel catalysts according to the present invention without, however, limiting the same thereto.

EXAMPLE 7

Carrier bodies obtained, for instance, according to Example 4 are placed into an impregnating vessel and are impregnated therein with an almost saturated aqueous solution of nickel nitrate which contains 3 kg. of nickel nitrate [$Ni(NO_3)_2 \cdot 6H_2O$ in 1 l. of water] at 90° C. for 3 hours. The catalyst is then removed and dried at 120° C. The nickel salt-containing carrier is activated by calcination in a cylindrical rotating furnace at 600° C. The activity of a catalyst obtained as described hereinabove was tested under the following condition:

Proportion of methane to steam by volume _ 1:1.5
Temperature of the catalyst _____ 700° C.
Space velocity of the methane (without
  regard to the steam) _____ [1] 600 hr.$^{-1}$

[1] 600 l. of methane under atmospheric pressure conditions and at 20° C. per hour per l. of catalyst.

The composition of the resulting synthesis gas at a gas expansion of 4.0 was as follows:

1.8% of carbon dioxide,
23.3% of carbon monoxide,
73.3% of hydrogen,
0.9% of methane.

Of course, many changes and variations in the carrier materials used, in the metals and metal oxides employed as catalysts, in the drying, dehydrating, baking, calcinating, and activating temperature and duration in the molding and shaping processes, in the impregnating procedure, and the like may be made by those skilled in the art in accordance with the principles set forth herein and in the claims annexed hereto.

As stated above, there may be used, in place of platinum, palladium, or nickel, other catalytically active agents as they have been mentioned hereinabove. Such other catalysts are prepared and used as will be described in the following further examples:

EXAMPLE 8

In place of the platinum (II) tetrammine hydroxide used in Example 5 the carriers may be impregnated with an aqueous solution of ammonium metavanadate while otherwise the procedure is the same as that described in said Example 5. Activation is effected by heating the dried catalyst bodies at 450° C. for 2 hours.

The resulting catalyst has proved to be highly effective in the manufacture of phthalic anhydride by catalytic oxidation of naphthalene or o-xylene respectively at a reaction temperature of about 400–500° C.

EXAMPLE 9

Another useful catalyst is obtained when impregnating the carrier prepared according to the procedure described in Example 5 with an aqueous solution, containing as well ammonium metavanadate as ammonium molybdate and, after drying, activating the impregnated catalysts at 450° C. for 2 hours.

These catalysts are particularly suitable for use in the catalytic conversion of benzene to maleic anhydride at a reaction temperature of 400–500° C.

EXAMPLE 10

When using an aqueous solution containing lithium nitrate, copper nitrate and chromium trioxide instead of platinum (II) tetrammine hydroxide for the impregnation of the carriers used in Example 5 while otherwise the procedure is the same as that described in said Example 5, with the exception that activation is effected by calcination at 900° C., a catalyst is obtained, which has a high oxidative activity and which therefore has proved effective in the conversion of auto exhaust gases into harmless oxidation products.

EXAMPLE 11

Another effective catalyst for the combustion of auto exhaust gases is obtained by proceeding in the following manner:

The carrier bodies prepared as described in Example 5 are soaked in a solution containing magnesium nitrate, cobalt nitrate and nickel nitrate for about 3 hours at 90° C. The impregnated carrier is then removed from the solution, dried at 120° C. for 2 hours and subsequently at 250° C. for one hour. This drying step is then followed by an activation step i.e. heating at 800° C. with the admission of air.

Subsequently the impregnation and drying procedure is repeated with a solution containing platinum (II) tetrammine hydroxide and palladium (II) tetrammine hydroxide instead of magnesium nitrate, cobalt nitrate and nickel nitrate. After the final activation at 800° C. the resulting catalyst has proved to be highly effective in the purification of auto exhaust gases.

I claim:
1. A high temperature-resistant shaped catalyst carrier of high mechanical strength, said carrier consisting of a calcined shaped carrier body composed of 14 parts by weight to 93 parts by weight of calcined chemically untreated clay and 86 parts by weight to 7 parts by weight of aluminum oxide, said shaped catalyst carrier bodies being calcined at a temperature between about 900° C. and about 1400° C. and having a specific surface area between about 1 sq. m./g. and about 100 sq. m./g. and a pore diameter between about 300 angstrom units and about 3000 angstrom units.

2. The product of claim 1 wherein the calcination was carried out in the presence of a molding lubricant.

3. The product of claim 1 wherein the calcination was carried out in the presence of an agent increasing the porosity of the carrier.

4. A high temperature-resistant shaped catalyst carrier of high mechanical strength, said carrier consisting of a calcined shaped carrier body composed of 14 parts by weight to 93 parts by weight of calcined chemically untreated clay and 86 parts by weight to 7 parts by weight of aluminum oxide, said shaped catalyst carrier bodies being calcined at a temperature between about 1000° C. and about 1200° C. and having a specific surface area between about 1 sq m./g. and about 100 sq. m./g. and a pore diameter between about 300 angstrom units and about 3000 angstrom units.

5. In a process of producing a high temperature-resistant shaped catalyst carrier of high mechanical strength, the steps which comprise intimately mixing between about 10 parts by weight and about 90 parts by weight of chemically untreated clay and between about 90 parts by weight and about 10 parts by weight of aluminum hydroxide, admixing water, shaping said mixture to produce coherent catalyst carrier bodies, drying said bodies, and calcining the dried bodies at a temperature between about 900° C. and about 1400° C., the amount of clay ranging from about 14 to about 93 parts by weight and the amount of aluminum oxide ranging between about 86 to about 7 parts by weight.

6. A high temperature-resistant shaped catalyst carrier of a high mechanical strength, said carrier consisting of a calcined shaped carrier body composed of calcined chemically untreated clay and of aluminum oxide, said carrier bodies having a specific surface area between about 1 sq. m./g. and about 100 sq. m./g. and a pore diameter between about 300 angstrom units and about 3000 angstrom units, the burst pressure strength determined on cylindrical extrusions of said carrier of a diameter of 4 mm. being between about 15 kg. and about 25 kg., the amount of clay ranging from about 14 to about 93 parts by weight and the amount of aluminum oxide ranging between about 86 to about 7 parts by weight.

7. In a process of producing a high temperature-resistant shaped catalyst carrier of high mechanical strength, the steps which comprise intimately mixing chemically untreated clay and aluminum hydroxide, shaping said mixture to produce coherent catalyst carrier bodies, drying said bodies at a temperature not substantially exceeding 100° C., dehydrating the dried bodies at a temperature between about 300° C. and about 650 C., and calcining the dried bodies at a temperature between about 900° C. and about 1400° C., the amount of clay ranging between about 10 parts to about 90 parts by weight and the amount of aluminum hydroxide ranging between about 90 parts to about 10 parts by weight.

8. The process according to claim 7, wherein the chemically untreated clay is a kaolinite-type clay.

9. The process according to claim 7, wherein the chemically untreated clay is bentonite.

10. High temperature-resistant shaped oxidation catalyst of high mechanical strength, said catalyst consisting of calcined shaped catalyst carrier bodies composed of calcined chemically untreated clay and aluminum oxide, said shaped catalyst carrier bodies being calcined at a temperature between about 900° C. and about 1400° C., and of a platinum metal being uniformly distributed throughout said carrier and being present therein in an amount between about 0.01% and about 0.20% thereof, the amount of clay ranging from about 14 to about 93 parts by weight and the amount of aluminum oxide ranging between about 86 to about 7 parts by weight and said catalyst being activated by heating to a temperature between about 800° C. and about 900° C. in the presence of oxygen.

11. In a process of producing a high temperature-resistant shaped oxidation catalyst of high mechanical strength, the steps which comprise intimately mixing chemically untreated clay and aluminum hydroxide, shaping said mixture to produce coherent catalyst carrier bodies, drying said bodies, calcining the dried bodies at a temperature between about 900° C. and about 1400° C., impregnating the calcined catalyst carrier bodies with a solution of a platinum metal compound, drying the impregnated catalyst carrier bodies, and calcining the dried bodies at a temperature of at least 800° C. with the admission of oxygen to activate the catalyst, the amount of clay ranging between about 10 parts to about 90 parts by weight and the amount of aluminum hydroxide ranging between about 90 parts to about 10 parts by weight.

12. The process according to claim 11, wherein the platinum metal compound is platinum (II) tetrammine hydroxide.

13. The process according to claim 11, wherein the platinum metal compound is platinum (II) tetrammine chloride.

14. In a process of producing a high temperature-resistant shaped oxidation catalyst of high mechanical strength, the steps which comprise intimately mixing chemically untreated clay, aluminum hydroxide, an agent increasing the porosity of the resulting catalyst, and a molding lubricant, shaping said mixture to produce coherent catalyst carrier bodies, drying said bodies at about 100° C., calcining the dried bodies at a temperature between about 900° C. and about 1400° C., impregnating the calcined catalyst carrier bodies with a solution of a platinum metal compound selected from the group consisting of a platinum compound and a palladium compound, drying the impregnated catalyst carrier bodies, and calcining the dried bodies at a temperature of at least 800° C. with the admission of oxygen to activate the catalyst, the amount of clay ranging between about 10 parts to about 90 parts by weight and the amount of aluminum hydroxide ranging between about 90 parts to about 10 parts by weight.

15. A high temperature-resistant shaped catalyst of high mechanical strength, said catalyst consisting of calcined shaped catalyst carrier bodies composed of chemically untreated clay and of aluminum oxide, said carrier bodies being calcined at a temperature between about 900° C. and about 1400° C., and of a catalytically active agent selected from the group consisting of catalytically active metals and catalytically active metal oxides, said catalytically active agent being uniformly distributed throughout said carrier, the amount of clay ranging from about 14 to about 93 parts by weight and the amount of aluminum oxide ranging between about 86 to about 7 parts by weight.

16. In a process of producing a high temperature-ressitant shaped catalyst of high activity, the steps which comprise intimately mixing chemically untreated clay, aluminum hydroxide, a porosity increasing agent, and a molding lubricant, shaping said mixture to produce coherent catalyst carrier bodies, drying said bodies, calcining the dried bodies at a temperature between about 900° C. and about 1400° C., impregnating the calcined catalyst carrier bodies with a catalytically active agent selected from the group consisting of catalytically active metals ind catalytically active metal compounds, drying the impregnated catalyst carrier bodies, and activating the dried catalyst bodies, the amount of clay ranging between about 10 parts to about 90 parts by weight and the amount of aluminum hydroxide ranging between about 90 parts to about 10 parts by weight.

17. A process of producing a high temperature-resistant shaped catalyst carrier of high mechanical strength, the steps which comprise intimately mixing between about 10 parts by weight and about 90 parts by weight of chemically untreated clay and between about 90 parts by weight and about 10 parts by weight of aluminum hydroxide, shaping said mixture to produce coherent catalyst carrier bodies and calcining the bodies at a temperature between about 900° C. and about 1400° C.

18. The process of claim 17 in which the aluminum hydroxide and the clay are mixed while dry.

19. The process of claim 17 in which the amount of clay ranges between about 20 parts to about 40 parts by weight and the amount of aluminum hydroxide ranges between about 80 parts to about 60 parts by weight.

20. In a process of producing a high temperature-resistant shaped catalyst carrier of high mechanical strength, the steps which comprise intimately mixing chemically untreated clay and aluminum hydroxide and water, shaping said mixture to produce coherent catalyst carrier bodies, drying the bodies at a temperature of not over about 100° C. and calcining the bodies at a temperature between about 900° C. and about 1400° C., the amount of clay ranging between about 10 parts to about 90 parts by weight and the amount of aluminum hydroxide ranging between about 90 parts to about 10 parts by weight.

References Cited by the Examiner
UNITED STATES PATENTS

| | | | |
|---|---|---|---|
| 2,071,119 | 2/1937 | Harger | 23—2.2 |
| 2,444,965 | 7/1948 | Thomas et al. | 252—455 |
| 2,455,713 | 12/1948 | Voorhies | 252—455 X |

(Other references on following page)

UNITED STATES PATENTS

| | | | |
|---|---|---|---|
| 2,632,690 | 3/1953 | Atwell | 23—212 |
| 2,639,223 | 5/1953 | Shapleigh | 23—212 |
| 2,840,530 | 6/1958 | Milliken et al. | 252—455 |
| 2,963,448 | 12/1960 | Ray | 252—455 |
| 2,989,488 | 6/1961 | Connor et al. | 252—455 |
| 3,001,952 | 9/1961 | Reitmeier et al. | 252—455 |
| 3,006,718 | 10/1961 | Gary | 23—2 |
| 3,065,595 | 11/1962 | Gary | 23—2.2 X |
| 3,067,002 | 12/1962 | Reid | 23—2 |

MAURICE A. BRINDISI, *Primary Examiner.*

BENJAMIN HENKIN, *Examiner.*